US012726629B2

(12) United States Patent
Kato et al.

(10) Patent No.: US 12,726,629 B2
(45) Date of Patent: Sep. 1, 2026

(54) IMAGE DECODING DEVICE, IMAGE DECODING METHOD, AND PROGRAM

(71) Applicant: KDDI CORPORATION, Tokyo (JP)

(72) Inventors: Haruhisa Kato, Fujimino (JP); Yoshitaka Kidani, Fujimino (JP)

(73) Assignee: KDDI CORPORATION, Tokyo (JP)

( * ) Notice: Subject to any disclaimer, the term of this patent is extended or adjusted under 35 U.S.C. 154(b) by 57 days.

(21) Appl. No.: 18/595,564

(22) Filed: Mar. 5, 2024

(65) Prior Publication Data

US 2024/0214577 A1 Jun. 27, 2024

Related U.S. Application Data

(63) Continuation of application No. PCT/JP2023/008636, filed on Mar. 7, 2023.

(30) Foreign Application Priority Data

Jul. 1, 2022 (JP) ................................ 2022-107167

(51) Int. Cl.

| | |
|---|---|
| ***H04N 19/139*** | (2014.01) |
| ***H04N 19/119*** | (2014.01) |
| ***H04N 19/124*** | (2014.01) |
| ***H04N 19/18*** | (2014.01) |

(52) U.S. Cl.

CPC ......... *H04N 19/139* (2014.11); *H04N 19/119* (2014.11); *H04N 19/124* (2014.11); *H04N 19/18* (2014.11)

(58) Field of Classification Search

None

See application file for complete search history.

(56) References Cited

U.S. PATENT DOCUMENTS

| | | | | |
|---|---|---|---|---|
| 12,010,304 | B2 * | 6/2024 | Lee | H04N 19/11 |
| 2019/0082192 | A1 | 3/2019 | Chuang et al. | |
| 2021/0120242 | A1 | 4/2021 | Nam et al. | |
| 2021/0136402 | A1 | 5/2021 | Lim et al. | |
| 2022/0109837 | A1 | 4/2022 | Nam et al. | |
| 2022/0360815 | A1 | 11/2022 | Lim et al. | |
| 2023/0023856 | A1 * | 1/2023 | Huo | H04N 19/543 |
| 2023/0048262 | A1 * | 2/2023 | Sim | H04N 19/119 |
| 2023/0108504 | A1 * | 4/2023 | Li | H04N 19/176 375/240.13 |
| 2023/0217023 | A1 | 7/2023 | Nam et al. | |
| 2023/0262255 | A1 | 8/2023 | Lim et al. | |

(Continued)

FOREIGN PATENT DOCUMENTS

| | | |
|---|---|---|
| JP | 2021514162 A | 6/2021 |
| JP | 2022051735 A | 4/2022 |
| WO | 2015006884 A1 | 1/2015 |

OTHER PUBLICATIONS

International Search Report (ISR) (and English language translation thereof) dated May 30, 2023, issued in International Application No. PCT/JP2023/008636.

(Continued)

*Primary Examiner* — Lindsay J Uhl

(74) *Attorney, Agent, or Firm* — Holtz, Holtz & Volek PC

(57) ABSTRACT

An image decoding device (200) includes a circuit that selects the motion vector candidates from among motion vectors of neighboring blocks of a block to be decoded based on the control information.

13 Claims, 6 Drawing Sheets

(56) References Cited

U.S. PATENT DOCUMENTS

2024/0267509 A1 * 8/2024 Lim ....................... H04N 19/96

OTHER PUBLICATIONS

"Versatile Video Coding", H266 ITU-T.

Written Opinion dated May 30, 2023, issued in International Application No. PCT/JP2023/008636.

Chen, et al., "CE4: Summary report on inter prediction with geometric partitioning", JVET-Q0024-v2.

Coban, et al., "Algorithm description of Enhanced Compression Model 3 (ECM 3)", JVET-X2025-v2, pp. 14-16.

Kidani, "EE2-3.I: GPM with inter and intra prediction", JVET-X0166, pp. 1-5.

Japanese Office Action (and an English language translation thereof) dated May 26, 2026, issued in corresponding Japanese Application No. 2025-141093.

Coban, et al., "Algorithm description of Enhanced Compression Model4 (ECM 4)", JVET- Y2025(version 2), ITU, Apr. 13, 2022,pp. 3,8,15,16, retrieved from <URL: https://jvet experts.org/doc_end_user/documents/25_Teleconference/wg11/JVET—Y2025-v2.zip>, [retrieved on May 7, 2026].

* cited by examiner

FIG. 4

SMALL AREA X
SMALL AREA Y
NEIGHBORING BLOCK
SMALL AREA A
BLOCK TO BE DECODED
SMALL AREA B

FIG. 5

IMAGE DECODING DEVICE, IMAGE DECODING METHOD, AND PROGRAM

CROSS-REFERENCE TO RELATED APPLICATIONS

The present application is a continuation of PCT Application No. PCT/JP2023/008636, filed on Mar. 7, 2023, which claims the benefit of Japanese patent application No. 2022-107167 filed on Jul. 1, 2022, the entire contents of which are incorporated herein by reference in its entirety.

TECHNICAL FIELD

The present invention relates to an image decoding device, an image decoding method, and a program.

BACKGROUND ART

Specifically, motion compensation is performed for each of the partitioned small areas using a motion vector and the partitioned small areas are blended by a weighted average.

CITATION LIST

Non Patent Literature

Non Patent Literature 1: ITU-T H. 266 VVC

Non Patent Literature 2: CE4: Summary report on inter prediction with geometric partitioning, JVET-Q0024

SUMMARY OF THE INVENTION

In Non patent Literature 1 and Non patent Literature 2, since motion vector candidates are selected from neighboring blocks without considering positional relationships and shapes of the partitioned small areas, there is still room for improvement in encoding performance.

Therefore, the present invention has been made in view of the above-described problem, and an object of the present invention is to provide an image decoding device, an image decoding method, and a program capable of improving encoding efficiency in GPM.

The first aspect of the present invention is summarized as an image decoding device including a circuit, wherein the circuit: decodes control information and a quantized value; inversely quantizes the quantized value to obtain a transform coefficient; inversely transforms the transform coefficient to obtain a prediction residual; generates a first predicted sample based on a decoded sample and the control information; accumulates the decoded sample; determines a motion vector based on the control information and motion vector candidates to obtain motion information; generates a second predicted sample based on the decoded sample, the motion information, and the control information; generates a third predicted sample based on the first predicted image, the second predicted sample, and the control information; adds one of the first to third predicted samples and the prediction residual to obtain a decoded sample; and selects the motion vector candidates from among motion vectors of neighboring blocks of a block to be decoded based on the control information.

The second aspect of the present invention is summarized as an image decoding method including: (A) decoding control information and a quantized value; (B) inversely quantizing the quantized value to obtain a transform coefficient; (C) inversely transforming the transform coefficient to obtain a prediction residual; (D) generating a first predicted sample based on a decoded sample and the control information; (E) accumulating the decoded sample; (F) determining a motion vector based on the control information and motion vector candidates to obtain motion information; (G) generating a second predicted sample based on the decoded sample, the motion information, and the control information; (H) generating a third predicted sample based on the first predicted image, the second predicted sample, and the control information; and (I) adding one of the first to third predicted samples and the prediction residual to obtain a decoded sample, wherein in the (F), the motion vector candidates are selected from among motion vectors of neighboring blocks of a block to be decoded based on the control information.

The third aspect of the present invention is summarized as a program stored on a non-transitory computer-readable medium for causing a computer to function as an image decoding device, the image decoding device comprising a circuit, wherein the circuit: decodes control information and a quantized value; inversely quantizes the quantized value to obtain a transform coefficient; inversely transforms the transform coefficient to obtain a prediction residual; generates a first predicted sample based on a decoded sample and the control information; an accumulation unit configured to accumulate the decoded sample; determines a motion vector based on the control information and motion vector candidates to obtain motion information; generates a second predicted sample based on the decoded sample, the motion information, and the control information; generates a third predicted sample based on the first predicted image, the second predicted sample, and the control information; adds one of the first to third predicted samples and the prediction residual to obtain a decoded sample; and selects the motion vector candidates from among motion vectors of neighboring blocks of a block to be decoded based on the control information.

According to the present invention, it is possible to provide an image decoding device, an image decoding method, and a program capable of improving encoding efficiency in GPM.

BRIEF DESCRIPTION OF THE DRAWINGS

FIG. 4 is a view illustrating an example of a case where an upper neighboring block of a block to be decoded is partitioned into small areas.

FIG. 5 is a flowchart illustrating an example of an operation of the image decoding device 200 according to an embodiment.

DESCRIPTION OF EMBODIMENTS

An embodiment of the present invention will be described hereinbelow with reference to the drawings. Note that the constituent elements of the embodiment below can, where appropriate, be substituted with existing constituent elements and the like, and that a wide range of variations, including combinations with other existing constituent elements, is possible. Therefore, there are no limitations placed on the content of the invention as in the claims on the basis of the disclosures of the embodiment hereinbelow.

Figure 1:
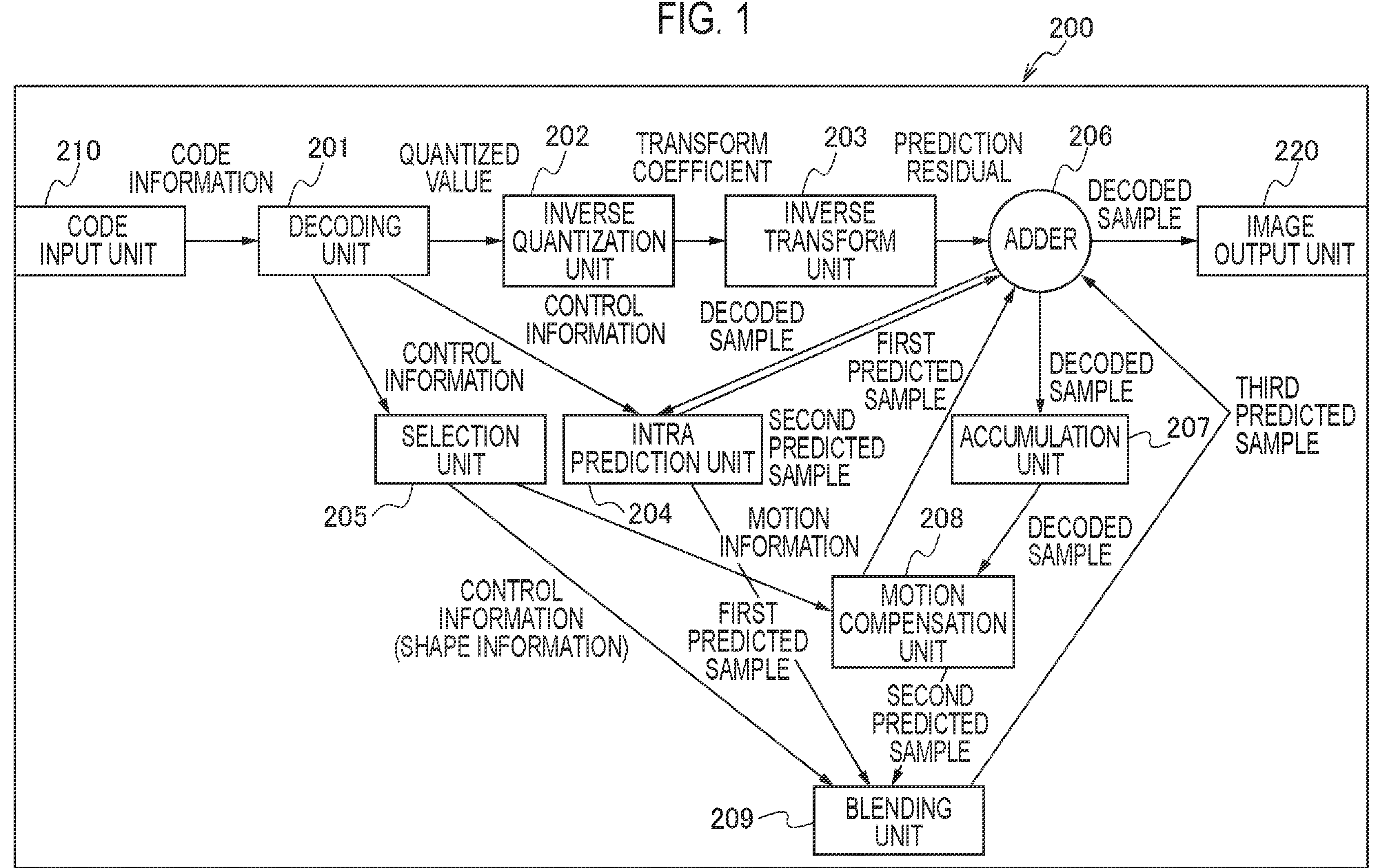
FIG. 1 is a diagram illustrating an example of functional blocks of an image decoding device 200 according to an embodiment.

Hereinbelow, an image decoding device 200 according to a first embodiment of the present invention is described with reference to FIGS. 1 to 6. FIG. 1 is a diagram illustrating an example of functional blocks of the image decoding device 200 according to the present embodiment.

As illustrated in FIG. 1, the image decoding device 200 includes a code input unit 210, a decoding unit 201, an inverse quantization unit 202, an inverse transform unit 203, an intra prediction unit 204, a selection unit 205, an adder 206, an accumulation unit 207, a motion compensation unit 208, a blending unit 209, and an image output unit 220.

The code input unit 210 is configured to acquire encoded information which is encoded by an image encoding device.

The decoding unit 201 is configured to decode control information and a quantized value from the encoded information which is input from the code input unit 210. For example, the decoding unit 201 is configured to output control information and a quantized value by performing variable length decoding on the encoded information.

Here, a quantized value is sent to the inverse quantization unit 202, and control information is sent to the intra prediction unit 204, the selection unit 205, the motion compensation unit 208, and the blending unit 209. Note that such control information includes information necessary for controlling the intra prediction unit 204, the selection unit 205, the motion compensation unit 208, the blending unit 209, etc., and may include header information such as a sequence parameter set, a picture parameter set, a picture header, or a slice header.

The inverse quantization unit 202 is configured to obtain a decoded transform coefficient by performing inverse quantization on the quantized value transmitted from the decoding unit 201. The transform coefficient is transmitted to the inverse transform unit 203.

The inverse transform unit 203 is configured to obtain a decoded prediction residual by performing inverse transform on the transform coefficient transmitted from the inverse quantization unit 202. The prediction residual is transmitted to the adder 206.

The intra prediction unit 204 is configured to generate a first predicted sample based on a decoded sample and the control information transmitted from the decoding unit 201. Here, the decoded sample is obtained via the adder 206, and is accumulated in the accumulation unit 207. Further, the first predicted sample is a predicted sample as an approximate value of an input sample in a small area which is set by the blending unit 209. Note that the first predicted sample is transmitted to the blending unit 209.

The accumulation unit 207 is configured to cumulatively accumulate the decoded samples transmitted from the adder 206. The decoded sample is referred to from the motion compensation unit 208 via the accumulation unit 207.

The motion compensation unit 208 is configured to generate a second predicted sample based on a decoded sample accumulated in the accumulation unit 207 and motion information sent from the selection unit 205. Here, the second predicted sample is a predicted sample as an approximate value of an input sample in a small area set by the blending unit 209. Note that the second predicted sample is sent to the adder 206 or the blending unit 209.

The adder 206 is configured to add one of first to third predicted samples generated from the decoded sample or the like and a prediction residual sent from the inverse transform unit 203 to obtain a decoded sample. The decoded sample is sent to the image output unit 220, the accumulation unit 207, and the intra prediction unit 204.

The blending unit 209 is configured to partition a block to be decoded into a plurality of shapes based on the first predicted sample sent from the intra prediction unit, the second predicted sample sent from the motion compensation unit 208, and the control information (e.g., shape information indicating a partitioned shape of the block to be decoded) sent from the selection unit 205, blend the plurality of predicted samples corresponding to the respective shapes, and generate a third predicted sample to be added with a prediction residual by the adder 206. The generated third predicted sample is sent to the adder 206.

Any method can be used as a method of partitioning the block to be decoded into a plurality of shapes (small areas) and blending a plurality of samples by the blending unit 209, the following description will be made assuming that a geometric partitioning mode (GPM) as an example.

Hereinafter, an example of a method for selection from among a plurality of motion vector candidates by the selection unit 205, which is a characteristic configuration of the image decoding device 200 according to the present embodiment, will be described.

The selection unit 205 is configured to determine a motion vector as motion information based on the control information and the motion vector candidates.

Specifically, the selection unit 205 is configured to select motion vector candidates from among motion vectors of neighboring blocks of the block to be decoded, based on the control information. As a result, the motion vector can be determined using cu_mv_idx with a small data amount.

Figure 2:
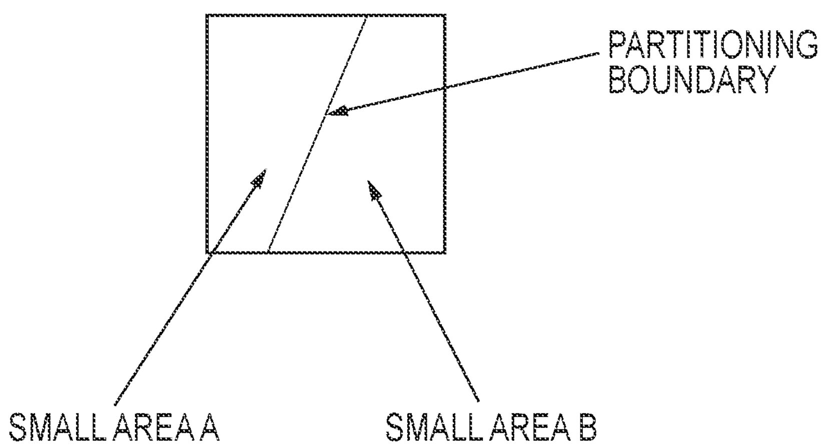
FIG. 2 is a diagram illustrating an example of a case where a rectangular unit block is divided into two areas of a small area A and a small area B by a division boundary.

In an example of FIG. 2, an example of a case where a unit block is distributed in an oblique shape is illustrated. In the example of FIG. 2, a rectangular unit block (a block to be decoded) is partitioned into two areas, small area A and small area B, by a partitioning boundary.

In each of the small areas A and B, a second predicted sample is generated by motion compensation. At this time, in order to reduce the code amount of the motion vector itself used for motion compensation, a method of diverting the motion vector of the neighboring block of the block to be decoded can be used as a conventional method.

According to such a method, since the code amount for expressing the neighboring block of which the motion vector to be used is diverted is smaller than the code amount for expressing the motion vector itself, the encoding efficiency can be improved.

Figure 3:
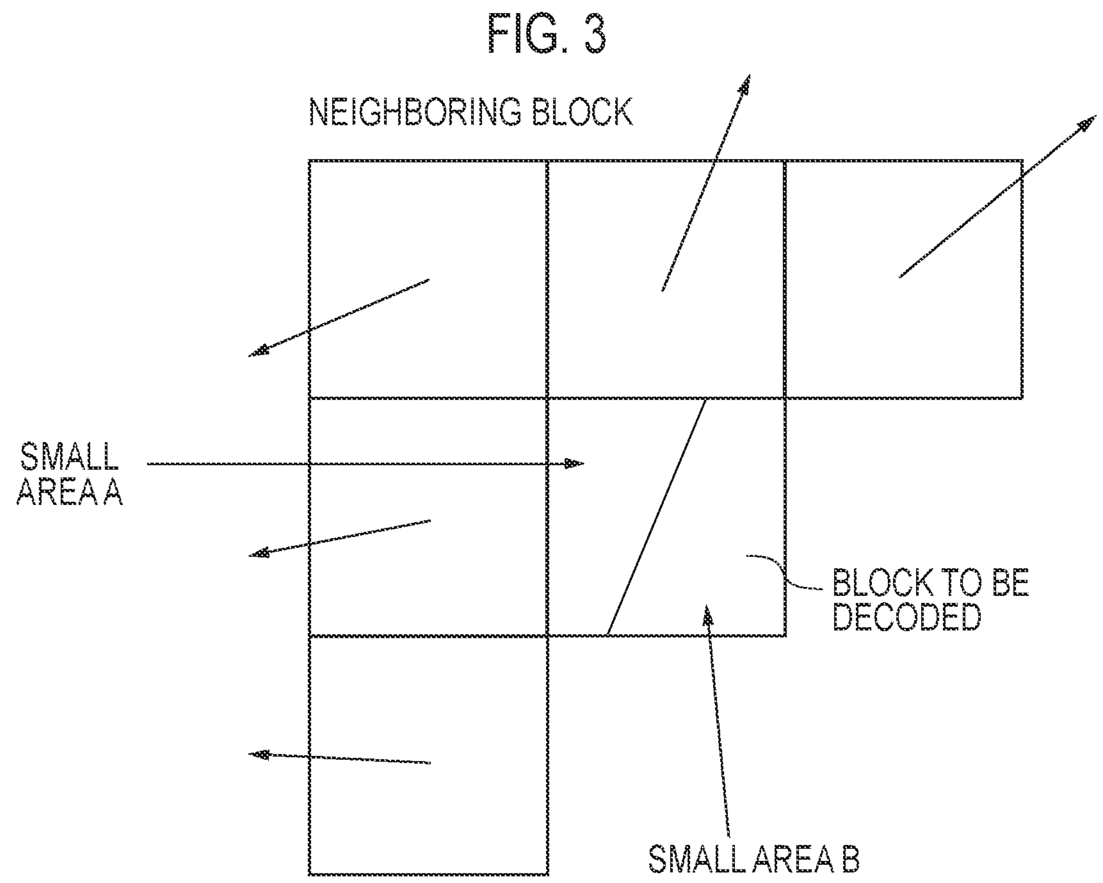
FIG. 3 is a view illustrating an example of neighboring blocks of a block to be decoded.

Specifically, as illustrated in FIG. 3, since there are a plurality of neighboring blocks such as upper, left, and upper-left blocks, a motion vector candidate list is constructed by listing motion vectors of available neighboring blocks and eliminating similar motion vectors.

Then, only an index corresponding to a motion vector of a neighboring block to be used in the motion compensation unit 208 is decoded as the control information (cu_mv_idx), and the motion vector is determined based on the control information.

However, since the motion vectors of the plurality of neighboring blocks are not selected with equal probability, there is a problem that the encoding efficiency cannot be improved.

For example, the sample distribution characteristics that are the same as those of the small area A illustrated in FIG.

2 spread largely on the left side, and thus, there is a high probability that a neighboring block having a motion vector diverted by the small area B is located on the upper side, rather than on the left side.

In order to solve such a problem, the selection unit 205 may be configured to limit the motion vector candidates described above according to the partitioned shape of the block to be decoded.

FIG. 3 illustrates five neighboring blocks (upper-left, left, lower-left, upper, upper-right blocks) of the block to be decoded.

In the example of FIG. 3, since the small area B is in direct contact with the upper neighboring block, the selection unit 205 may be configured to add a motion vector of the upper neighboring block to the motion vector candidates.

In addition, even though the small area B does not directly contact the upper-right neighboring block, the selection unit 205 may be configured to add a motion vector of the upper-right neighboring block to the motion vector candidates on the assumption that the characteristics that are the same as those of the small area B continue.

Note that the selection unit 205 may be configured not to add motion vectors of the other blocks, the upper-left, left, and lower-left neighboring blocks, to the motion vector candidates on the assumption that their sample distribution characteristics are different.

Since the two motion vectors of the upper neighboring block and the upper-right neighboring block are selected as motion vector candidates for the small area B, the selection unit 205 is configured to determine a motion vector to be used by the motion compensation unit 208 from among the selected motion vector candidates based on the control information.

If motion vector candidates are not limited, the motion vectors of all the neighboring blocks become motion vector candidates, which increases the code amount of control information for determining a motion vector to be used. However, by limiting the motion vector candidates to a small number of motion vector candidates with a high probability of being selected, it is possible to reduce the code amount of the control information.

On the other hand, since the small area A is in contact with different areas (neighboring blocks or small areas) in contact with the small area B, the selection unit 205 can configure motion vector candidates for the small area A different from those for the small area B, that is, configure motion vector candidates different for each small area.

Since the small area A is in direct contact with the upper neighboring block and the left neighboring block, the selection unit 205 may be configured to add motion vectors of the upper and left neighboring blocks to the motion vector candidates.

In addition, even though the small area A does not directly contact the upper-left and lower-left neighboring blocks, the selection unit 205 may be configured to add motion vectors of such neighboring blocks to the motion vector candidates on the assumption that the characteristics that are the same as those of the small area A continue in such neighboring blocks.

As in the above-described example, there may be a motion vector of an overlapping neighboring block among the motion vector candidates between the small areas (small area A: left, upper, upper-left, lower-left neighboring blocks/small area B: upper and upper-right neighboring blocks), or the motion vector candidates for each small area may be configured exclusively by adding a motion vector of an overlapping neighboring block among the motion vector candidates for each small area to the motion vector candidates for the small area having the smaller number of candidates (small area A: left, upper-left, and lower-left neighboring blocks/small area B: upper and upper-right neighboring blocks).

Alternatively, in order to simplify the processing, the selection unit 205 may be configured to select a motion vector candidate only when the small area is in contact with one of the upper neighboring block and the left neighboring block.

By not limiting motion vector candidates for a small area that is in contact with both the upper and left neighboring blocks (small area A: left, upper, upper-left, lower-left, and upper-right neighboring blocks/small area B: upper and upper-right neighboring blocks), the selection unit 205 can omit additional processing.

Conversely, in order to improve accuracy, in a case where the number of selected motion vector candidates is smaller than a predetermined number, the selection unit 205 may be configured to newly generate a motion vector and add the motion vector to the motion vector candidates.

For example, since motion vector candidates are limited to two motion vectors of the upper and upper-right neighboring blocks, for the small area B illustrated in FIG. 3, it is possible to expand the motion vector candidates by deriving a new motion vector from the motion vectors of the upper and upper-right neighboring blocks in order to compensate for the reduced motion vector candidates.

As a method for deriving a new motion vector, the new motion vector can be derived by a weight average of the plurality of motion vector candidates.

As such a weight, an inverse number of a cost obtained by template matching between the neighboring areas can be used. Further, a weight may be fixedly given (for example, small area B: upper and upper-right neighboring blocks, (upper+upper-right)/2, (upper+3*upper-right)/4, (3×upper+upper-right)/4, and the like).

Note that, in a case where a small area is not in contact with either the left neighboring block or the upper neighboring block, the selection unit 205 may be configured not to limit motion vector candidates, or may be configured to limit specific motion vector candidates according to the partitioned shape.

For example, the selection unit 205 may limit the motion vector candidates to the top N motion vector candidates in ascending order of shortest distance between coordinates of the neighboring block included in the motion vector candidates and the partitioning line.

In addition, in the GPM, bidirectional prediction cannot be used in the small area, but even in a case where bidirectional prediction can be used in the small area, the selection unit 205 may similarly be configured to determine two motion vectors from among the selected motion vector candidates according to the control information.

Furthermore, in a case where both the block to be decoded and the neighboring blocks are partitioned into small areas, the selection unit 205 may be configured to add a motion vector of a small area of a neighboring block contacting the small area of the block to be decoded in a longer length to the motion vector candidates.

Figure 4:
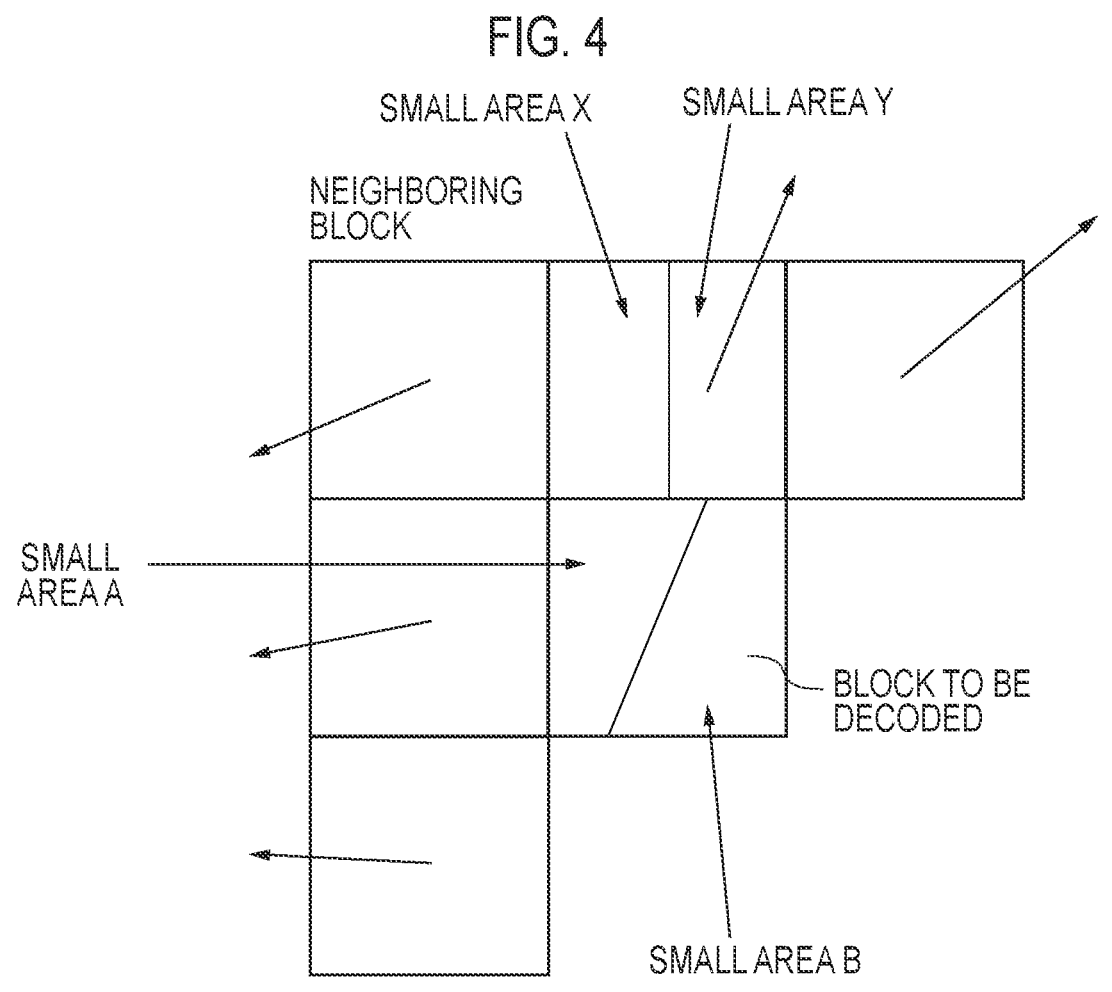

FIG. 4 illustrates an example of a case where an upper neighboring block of a block to be decoded is partitioned into small areas.

In the example of FIG. 4, a length of a side of the small area A contacting the right small area Y of the upper neighboring block is shorter than a length of a side of the small area A contacting the left small area X of the upper neighboring block. In such a case, the selection unit 205 may be configured to add a motion vector of the small area X to the motion vector candidates.

According to such a configuration, by selecting a motion vector that is highly likely to be selected as a motion vector candidate, it is possible to improve encoding efficiency.

Furthermore, the selection unit 205 may be configured to change the order (way) in which the motion vector candidates are arranged according to the partitioned shape.

For example, in a case where there are motion vector candidates of four neighboring blocks, the upper, upper-left, left, and lower-left neighboring blocks, for the small area A of FIG. 3, there is a higher probability (selection probability) that the motion vector of the left neighboring block than the upper neighboring block is selected. Therefore, it is preferable to arrange the motion vector candidates in the order of the motion vector of the left neighboring block→the motion vector of the upper neighboring block.

That is, by arranging the motion vector candidates in order of high selection probability, it is possible to shorten the average code length of the control information.

Specifically, with respect to the order in which the motion vector candidates are arranged, the selection unit 205 may be configured to prioritize a motion vector of a neighboring block directly contacting the block to be decoded more than a motion vector of a neighboring block indirectly contacting the block to be decoded.

In addition, with respect to the order in which the motion vector candidates are arranged, the selection unit 205 may be configured to give priority to a motion vector of a neighboring block (or small area) having a side contacting the small area obtained by partitioning the block to be decoded in a longer length.

Alternatively, with respect to the order in which the motion vector candidates are arranged, the selection unit 205 can arrange the motion vector candidates in ascending order of cost obtained by template matching between neighboring areas (neighboring blocks or small areas).

Note that the code information input to the decoding unit 201 can include a sequence parameter set (SPS) in which control information is summarized in units of sequences. Furthermore, such code information can include a picture parameter set (PPS) or a picture header (PH) in which control information is summarized in units of pictures. Such code information may include a slice header (SH) in which control information is summarized in units of slices.

Hereinafter, an example of a method of selecting motion vector candidates in units of sequences will be described with reference to FIGS. 5 and 6.

Figure 5:
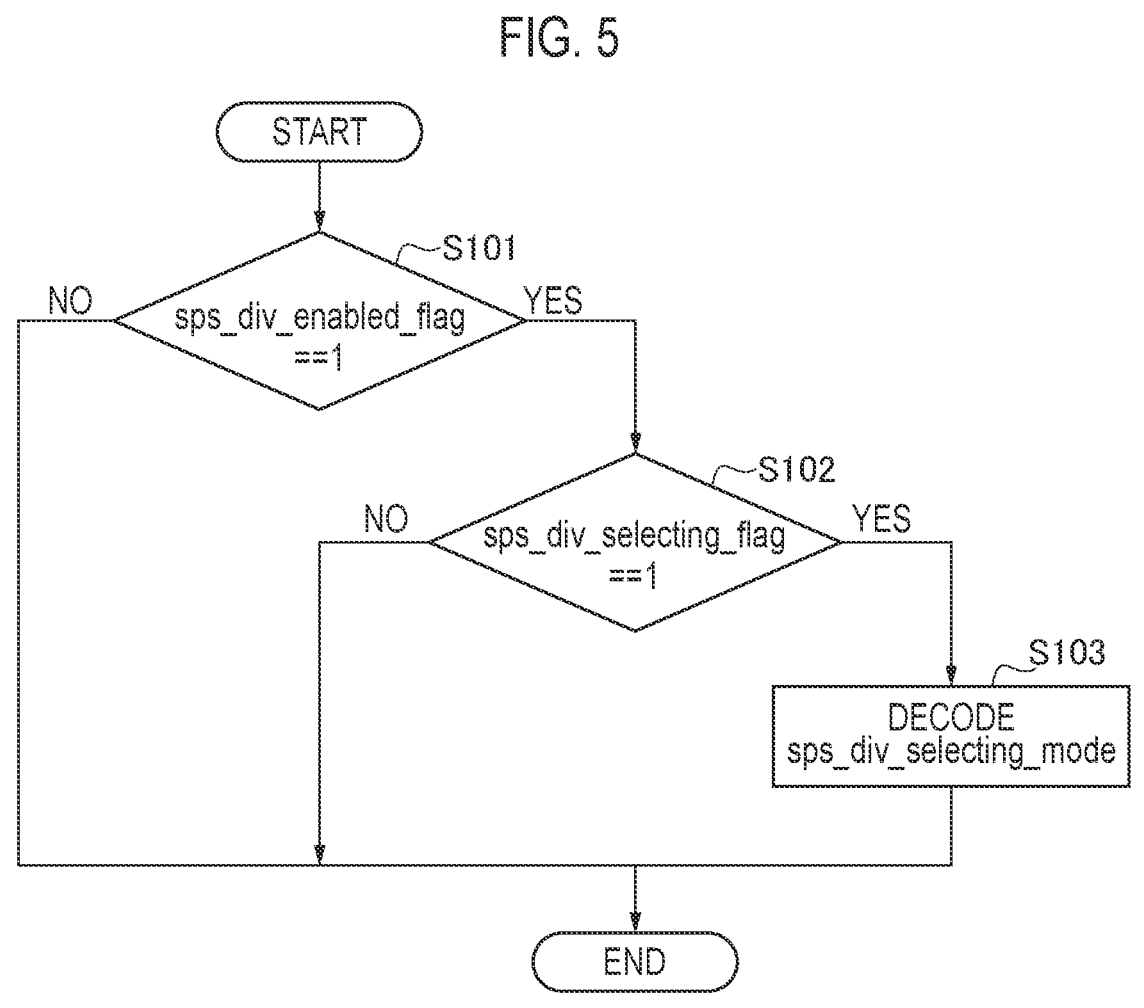

As illustrated in FIG. 5, in step S101, the decoding unit 201 determines whether sps_div_enabled_flag is 1 in the SPS.

Here, sps_div_enabled_flag is syntax for controlling the presence or absence of the partitioning mode. When sps_div_enabled_flag is 1, this indicates that the partitioning mode is valid, and when sps_div_enabled_flag is 0, this indicates that the partitioning mode is invalid.

If Yes (if 1), the operation proceeds to step S102, and if No (if 0), the operation ends without applying the technology according to the present embodiment.

In step S102, the decoding unit 201 decodes sps_div_selecting_flag, and determines whether sps_div_selecting_flag is 1.

Here, sps_div_selecting_flag is syntax for controlling whether to select motion vector candidates. When sps_div_selecting_flag is 1, this indicates that selection of motion vector candidates is valid, and when sps_div_selecting_flag is 0, this indicates that selection of motion vector candidates is invalid.

If Yes (if 1), the operation proceeds to step S103, and if No (if 0), the operation ends without applying the technology according to the present embodiment.

In step S103, the decoding unit 201 decodes sps_div_selecting_mode.

Here, sps_div_selecting_mode is syntax for controlling a method of selecting motion vector candidates.

By using sps_div_selecting_mode, the setting of the method of selecting motion vector candidates can be changed in units of sequences according to image characteristics, thereby expecting the encoding efficiency maximizing effect.

For example, it is possible to perform setting such that an overlap of a motion vector candidate between the small areas is allowed for a sequence including an image with complicated motion, and it is possible to exclusively set a motion vector candidate for each small area for a sequence including an image with monotonous motion. Therefore, the encoding efficiency can be maximized.

Note that, in a case where the method of selecting motion vector candidates is set in units of pictures, the decoding unit 201 decodes pps_div_enabled_flag, pps_div_selecting_flag, and pps_div_selecting_mode in the picture parameter set or the picture header, similarly to the operation in FIG. 5.

By using pps_div_selecting_mode, the setting of the method of selecting motion vector candidates can be changed in units of pictures according to image characteristics, thereby expecting the encoding efficiency maximizing effect.

For example, it is possible to perform setting such that an overlap of a motion vector candidate between the small areas is allowed for an image picture with complicated motion, and it is possible to exclusively set a motion vector candidate for each small area for an image picture with monotonous motion. Therefore, the encoding efficiency can be maximized.

In addition, in a case where the method of selecting motion vector candidates is set in units of slices, the decoding unit 201 decodes sh_div_enabled_flag, sh_div_selecting_flag, and sh_div_selecting_mode in the slice header, similarly to the operation in FIG. 5.

By using sh_div_selecting_mode, the setting of the method of selecting motion vector candidates can be changed in units of slices according to image characteristics, thereby expecting the encoding efficiency maximizing effect.

For example, it is possible to perform setting such that an overlap of a motion vector candidate between the small areas is allowed for a slice area including a partial image with complicated motion, and it is possible to exclusively set a motion vector candidate for each small area for a slice area including a partial image with monotonous motion. Therefore, the encoding efficiency can be maximized.

The increase in code amount can be suppressed by setting the method of selecting motion vector candidates only in the upper layer, and adaptive control can be performed by prioritizing the setting in the lower layer after setting the method of selecting motion vector candidates in the lower layer as well.

Alternatively, when the method of selecting motion vector candidates is set in advance, the decoding of the method of selecting motion vector candidates can be omitted.

Note that, although the method of setting motion vector candidates in units of sequences, in units of pictures, or in units of slices has been described above as a setting method in the above-described example, a pattern for directly selecting motion vector candidates in units of blocks may be selected as will be described below, without setting the method of selecting motion vector candidates.

In such a case, while the degree of freedom in setting the number of patterns and the pattern type of the weighting factor decreases, the above-described increase in header information can be avoided.

The method of selecting motion vector candidates in units of blocks will be described below with reference to FIG. 6.

Figure 6:
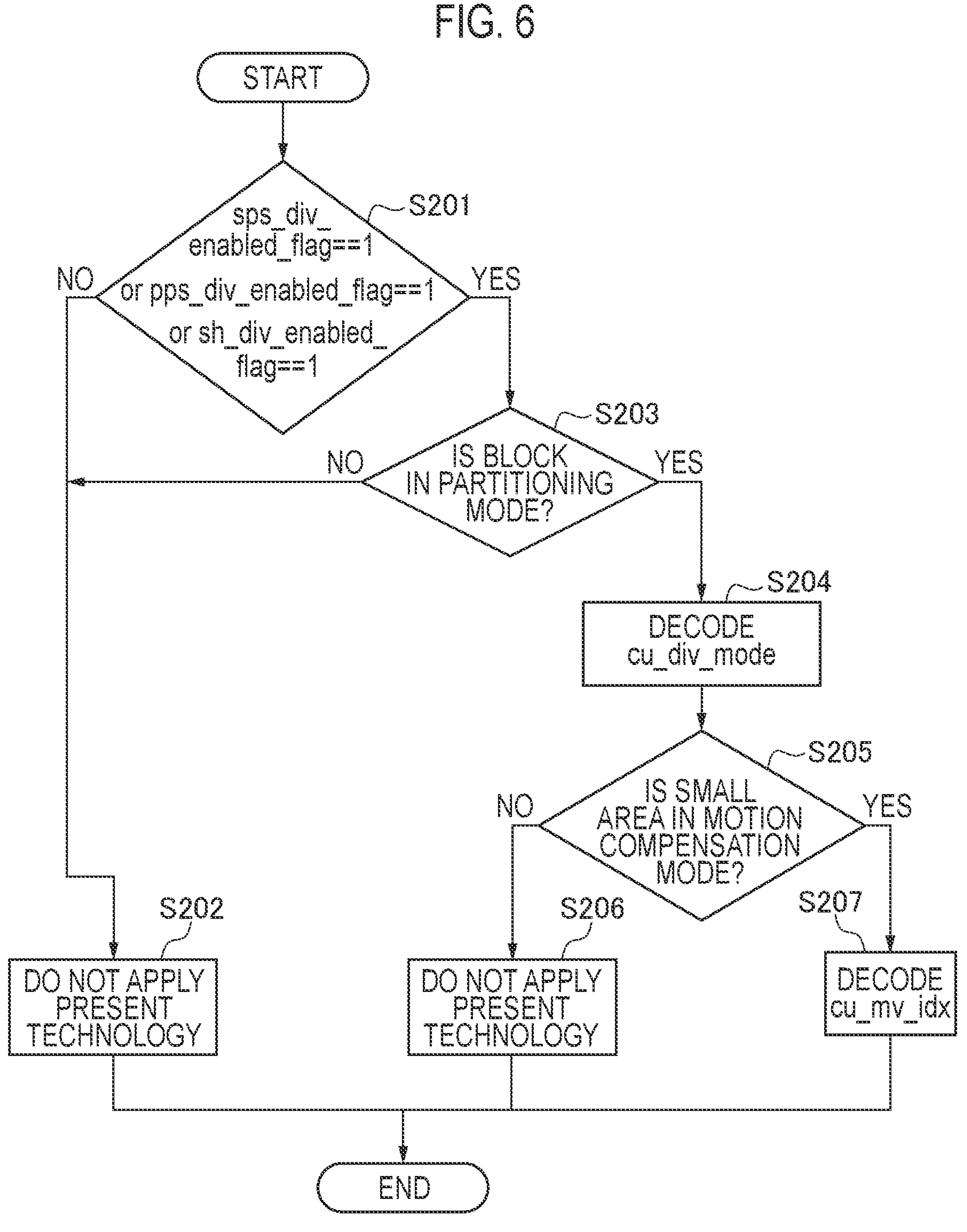
FIG. 6 is a flowchart illustrating an example of an operation of the image decoding device 200 according to an embodiment.

As illustrated in FIG. 6, in step S201, the decoding unit 201 determines whether any of sps_div_enabled_flag, pps_div_enabled_flag, and sh_div_enabled_flag is 1.

When none of them is 1, the operation proceeds to step S202, and ends without applying the technology according to the present embodiment.

When any one of them is 1, in step S203, the decoding unit 201 determines whether the block to be decoded is in the partitioning mode.

When the block to be decoded is not in the partitioning mode, the operation proceeds to step S202, and ends without applying the technology according to the present embodiment.

When the block to be decoded is in the partitioning mode, in step S204, the decoding unit 201 decodes cu_div_mode, which is a control signal representing the partitioning mode.

In step S205, the decoding unit 201 determines whether the small area to be decoded is in a motion compensation mode based on cu_div_mode.

If No, the operation proceeds to step S206 and ends without applying the technology according to the present embodiment.

If Yes, in step S207, the decoding unit 201 decodes cu_mv_idx, which is a control signal for designating a motion vector among the motion vector candidates.

In the example of FIG. 6, a case where one control signal, cu_mv_idx, is decoded is illustrated. However, in a case where two small areas are in the motion compensation mode or in a case where one small area is in a bidirectional motion compensation mode, the decoding unit 201 may decode two control signals, cu_mv_idx0 and cu_mv_idx1.

cu_mv_idx is decoded so as to specify one of the motion vector candidates selected by div_selecting_mode of the lowermost layer to be applied to the block to be decoded.

The image decoding device 200 according to the present embodiment is capable of adaptively partitioning a block and decoding a motion vector according to a partitioned shape, thereby improving the encoding efficiency.

Further, the image encoding device 100 and the image decoding device 200 may be realized as a program causing a computer to execute each function (each step).

According to the present embodiment, it is possible to improve the overall quality of service in video communications, thereby contributing to Goal 9 of the UN-led Sustainable Development Goals (SDGs) which is to "build resilient infrastructure, promote inclusive and sustainable industrialization and foster innovation".

What is claimed is:

1. An image decoding device comprising:

a circuit configured to:

decode control information and a quantized value;

inversely quantize the quantized value to obtain a transform coefficient;

inversely transform the transform coefficient to obtain a prediction residual;

generate a first predicted sample based on a decoded sample and the control information;

accumulate the decoded sample;

determine a motion vector based on the control information and motion vector candidates to obtain motion information;

generate a second predicted sample based on the decoded sample, the motion information, and the control information;

generate a third predicted sample based on the first predicted image, the second predicted sample, and the control information;

add one of the first to third predicted samples and the prediction residual to obtain a decoded sample; and select the motion vector candidates from among motion vectors of neighboring blocks of a block to be decoded based on the control information to construct a motion vector candidate list from which the motion vector is determined, wherein the circuit is configured to construct the motion vector candidate list by conditionally selecting, adding, or ordering motion vector candidates according to spatial positional relationships and contact states between (i) respective partitioned small areas of the block to be decoded obtained by partitioning the block to be decoded and (ii) the neighboring blocks, and wherein when both the block to be decoded and the neighboring blocks are partitioned into small areas, the circuit adds, to the motion vector candidates, from among motion vectors of small areas of a neighboring block having sides that contact a small area of the block to be decoded, a motion vector of a small area of the neighboring block having a side that contacts the small area of the block to be decoded over a longer length than a side of another small area of the neighboring block that contacts the block to be decoded.

2. The image decoding device according to claim 1, wherein the circuit limits the motion vector candidates according to a partitioned shape of the block to be decoded.

3. The image decoding device according to claim 1, wherein the circuit determines the motion vector from among the selected motion vector candidates based on the control information.

4. The image decoding device according to claim 1, wherein the circuit configures the motion vector candidates differently between the partitioned small areas.

5. The image decoding device according to claim 4, wherein the motion vector candidates overlap between the small areas.

6. The image decoding device according to claim 4, wherein the motion vector candidates for each of the small areas are exclusive.

7. The image decoding device according to claim 1, wherein when a small area obtained by partitioning the block to be decoded is in contact with only one of an upper block and a left block, the circuit limits the motion vector candidates for the small area based on the contact state between the small area and said one of the upper block and the left block, and when the small area is in contact with both the upper block and the left block, the circuit selects the motion vector candidates for the small area without limiting the motion vector candidates for the small area.

8. The image decoding device according to claim 1, wherein when the number of selected motion vector candidates is smaller than a predetermined number, the circuit newly generates a motion vector and adds the newly generated motion vector to the motion vector candidates.

9. The image decoding device according to claim 1, wherein the circuit changes an order in which the motion vector candidates are arranged according to a partitioned shape of the block to be decoded.

10. The image decoding device according to claim 9, wherein with respect to the order in which the motion vector candidates are arranged in the motion vector candidate list, the circuit prioritizes a motion vector of a neighboring block directly contacting the block to be decoded more than a motion vector of a neighboring block indirectly contacting the block to be decoded.

11. The image decoding device according to claim 9, wherein with respect to the order in which the motion vector candidates are arranged in the motion vector candidate list, the circuit gives priority to a motion vector of a neighboring block or small area having a side contacting a small area obtained by partitioning the block to be decoded over a longer length than a side of another neighboring block or small area that contacts the small area of the block to be decoded.

12. An image decoding method executed by a circuit of an image coding device, the method comprising:

(A) decoding control information and a quantized value;

(B) inversely quantizing the quantized value to obtain a transform coefficient;

(C) inversely transforming the transform coefficient to obtain a prediction residual;

(D) generating a first predicted sample based on a decoded sample and the control information;

(E) accumulating the decoded sample;

(F) determining a motion vector based on the control information and motion vector candidates to obtain motion information;

(G) generating a second predicted sample based on the decoded sample, the motion information, and the control information;

(H) generating a third predicted sample based on the first predicted image, the second predicted sample, and the control information; and (I) adding one of the first to third predicted samples and the prediction residual to obtain a decoded sample, wherein in the (F), the motion vector candidates are selected from among motion vectors of neighboring blocks of a block to be decoded based on the control information to construct a motion vector candidate list from which the motion vector is determined, in the (F), the motion vector candidate list is constructed by conditionally selecting, adding, or ordering motion vector candidates according to spatial positional relationships and contact states between (i) respective partitioned small areas of the block to be decoded obtained by partitioning the block to be decoded and (ii) the neighboring blocks, and in the (F), when both the block to be decoded and the neighboring blocks are partitioned into small areas, the circuit adds, to the motion vector candidates, from among motion vectors of small areas of a neighboring block having sides that contact a small area of the block to be decoded, a motion vector of a small area of the neighboring block having a side that contacts the small area of the block to be decoded over a longer length than a side of another small area of the neighboring block that contacts the block to be decoded.

13. A non-transitory computer-readable medium having stored thereon a program that is executable by a computer to cause the computer to function as an image decoding device comprising a circuit that is configured to:

decode control information and a quantized value;

inversely quantize the quantized value to obtain a transform coefficient;

inversely transform the transform coefficient to obtain a prediction residual;

generate a first predicted sample based on a decoded sample and the control information;

accumulate the decoded sample;

determine a motion vector based on the control information and motion vector candidates to obtain motion information;

generate a second predicted sample based on the decoded sample, the motion information, and the control information;

generate a third predicted sample based on the first predicted image, the second predicted sample, and the control information;

add one of the first to third predicted samples and the prediction residual to obtain a decoded sample; and select the motion vector candidates from among motion vectors of neighboring blocks of a block to be decoded based on the control information to construct a motion vector candidate list from which the motion vector is determined, wherein the circuit is configured to construct the motion vector candidate list by conditionally selecting, adding, or ordering motion vector candidates according to spatial positional relationships and contact states between (i) respective partitioned small areas of the block to be decoded obtained by partitioning the block to be decoded and (ii) the neighboring blocks, and wherein when both the block to be decoded and the neighboring blocks are partitioned into small areas, the circuit adds, to the motion vector candidates, from among motion vectors of small areas of a neighboring block having sides that contact a small area of the block to be decoded, a motion vector of a small area of the neighboring block having a side that contacts the small area of the block to be decoded over a longer length than a side of another small area of the neighboring block that contacts the block to be decoded.

* * * * *